United States Patent
Lee

(10) Patent No.: US 11,379,126 B2
(45) Date of Patent: Jul. 5, 2022

(54) DATA PROCESSING SYSTEM USING ARTIFICIAL INTELLIGENCE FOR POWER CONSUMPTION MANAGEMENT

(71) Applicant: SK hynix Inc., Gyeonggi-do (KR)

(72) Inventor: Junseo Lee, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/896,840

(22) Filed: Jun. 9, 2020

(65) Prior Publication Data

US 2021/0191632 A1 Jun. 24, 2021

(30) Foreign Application Priority Data

Dec. 18, 2019 (KR) .......................... 10-2019-0169428

(51) Int. Cl.
*G06F 3/06* (2006.01)
*G06F 1/3234* (2019.01)

(52) U.S. Cl.
CPC .......... *G06F 3/0625* (2013.01); *G06F 1/3275* (2013.01); *G06F 3/0604* (2013.01); *G06F 3/0619* (2013.01); *G06F 3/0653* (2013.01); *G06F 3/0659* (2013.01); *G06F 3/0683* (2013.01)

(58) Field of Classification Search
CPC .... G06F 3/0625; G06F 3/0659; G06F 3/0653; G06F 1/3275; G06F 3/0619; G06F 3/0683; G06F 3/0604
See application file for complete search history.

(56) References Cited

U.S. PATENT DOCUMENTS

| | | | | |
|---|---|---|---|---|
| 7,698,517 B2 * | 4/2010 | Tulyani | ................... | G06F 3/061 711/161 |
| 9,310,864 B1 * | 4/2016 | Klein | .................... | G06F 1/3206 |
| 9,851,771 B2 * | 12/2017 | Cooper | ................ | G06F 1/3275 |
| 9,983,652 B2 | 5/2018 | Piga et al. | | |
| 2007/0011421 A1 * | 1/2007 | Keller | ................... | G06F 1/3225 711/165 |
| 2011/0093726 A1 * | 4/2011 | Worthington | ......... | G06F 1/3225 713/320 |
| 2016/0085291 A1 * | 3/2016 | Ebsen | ................... | G06F 3/0625 713/320 |
| 2017/0038816 A1 * | 2/2017 | Madsen | ................ | G06F 1/3206 |

(Continued)

FOREIGN PATENT DOCUMENTS

KR 10-2010-0062954 6/2010
KR 10-2016-0098856 8/2016

(Continued)

*Primary Examiner* — Mark A Giardino, Jr.
(74) *Attorney, Agent, or Firm* — IP & T Group LLP

(57) ABSTRACT

A data processing system may include one or more first memory systems each comprising a first memory device, and suitable for generating analysis information by performing an AI (Artificial Intelligence) computation in order to analyze operation patterns for a plurality of accumulated commands transferred from a host and a plurality of accumulated addresses corresponding to the accumulated commands, and one or more second memory systems each comprising a second memory device having a lower operating speed than the first memory device, and suitable for selectively blocking access to the second memory device in response to the analysis information.

18 Claims, 8 Drawing Sheets

(56) References Cited

U.S. PATENT DOCUMENTS

2019/0101974 A1* 4/2019 Guim Bernat .......... G06F 3/067
2020/0104185 A1* 4/2020 Alvelda, VII ........... G06F 9/544

FOREIGN PATENT DOCUMENTS

| KR | 10-2016-0106801 | 9/2016 |
| KR | 10-2017-0027036 | 3/2017 |
| KR | 10-2017-0041526 | 4/2017 |

* cited by examiner

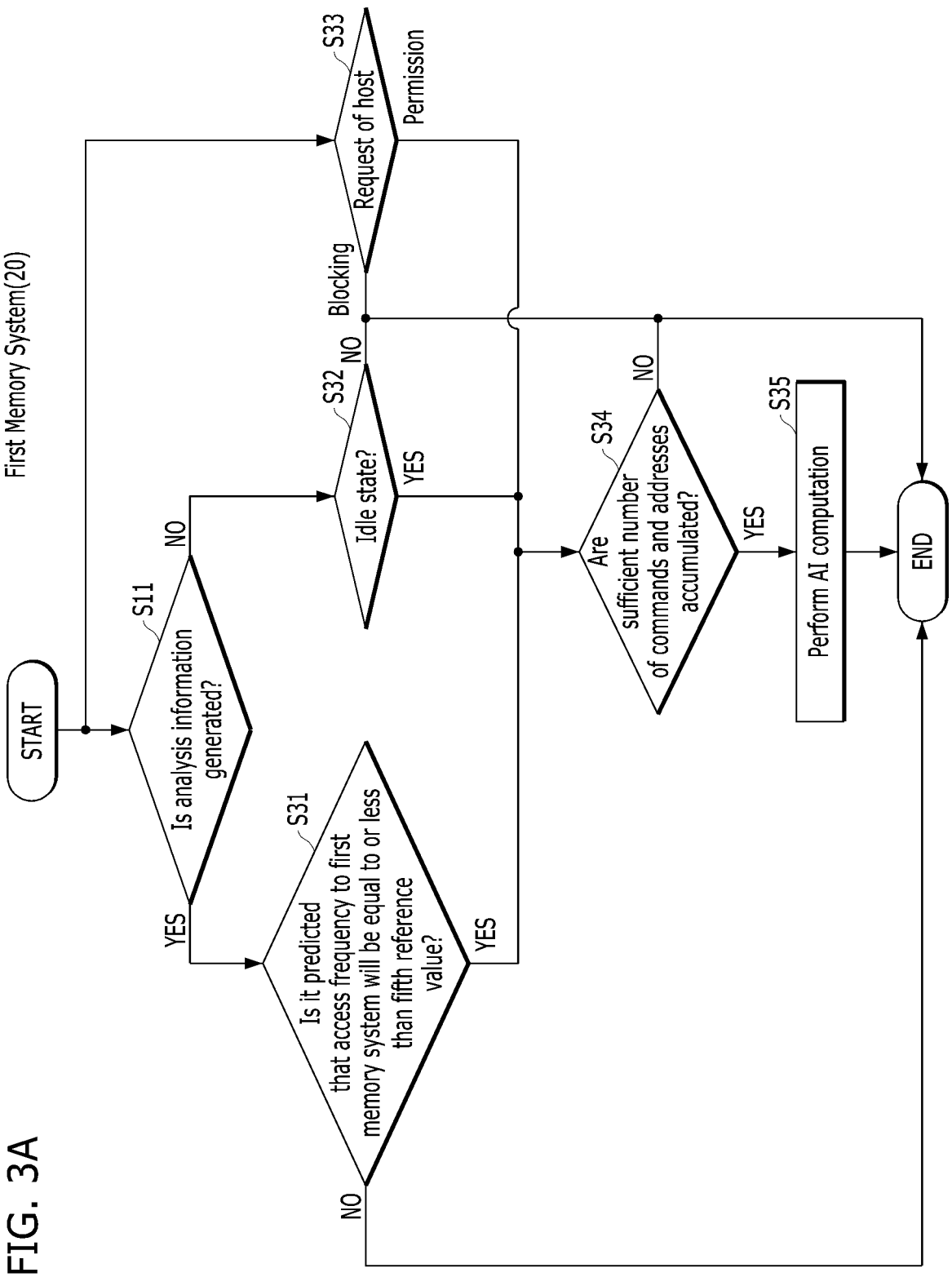

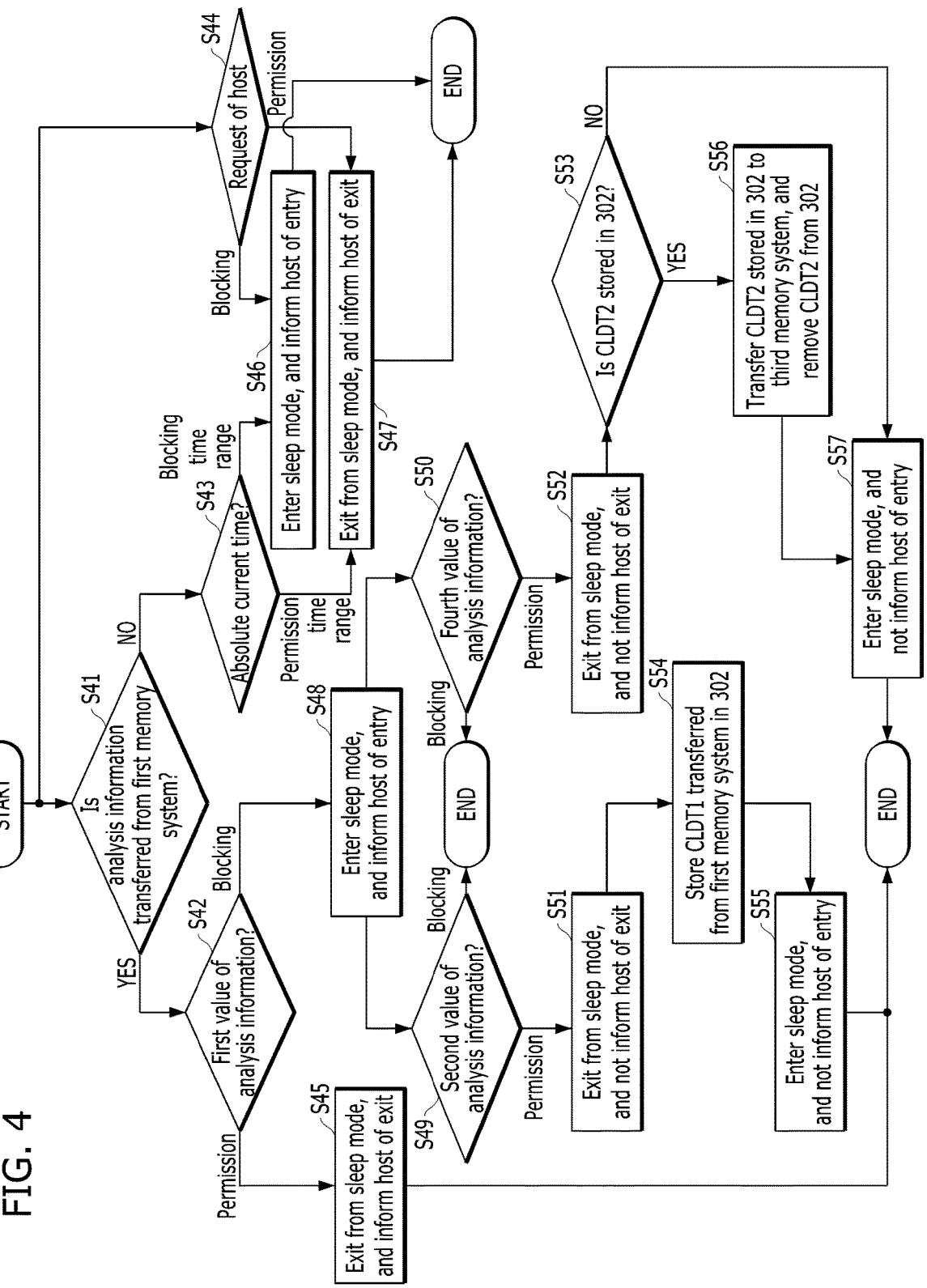

DATA PROCESSING SYSTEM USING ARTIFICIAL INTELLIGENCE FOR POWER CONSUMPTION MANAGEMENT

CROSS-REFERENCE TO RELATED APPLICATION

This application claims priority under 35 U.S.C. § 119 to Korean Patent Application No. 10-2019-0169428 filed on Dec. 18, 2019, which is incorporated herein by reference in its entirety.

BACKGROUND

1. Field

Various embodiments relate to a memory system, and more particularly, to a data processing system using Artificial Intelligence (AI) computation for power consumption management.

2. Discussion of the Related Art

AI is one branch of computer science and information technology for studying a method for enabling a computer to think, learn and self-improve like a human, and is a technology of enabling a computer to mimic an intelligent action of a human.

In order to implement such AI technology, a method of performing a machine learning operation using a learning algorithm such as data mining may be used.

Data mining is an operation of analyzing retained data from various points of view and combining the analysis results into useful information. For example, through data mining, patterns and correlations which are hidden in big data may be identified according to statistical techniques, and values may be applied to the patterns and correlations. Thus, information or knowledge contained in an enormous amount of data can be derived.

Machine learning indicates an operation of extracting information or knowledge using a learning algorithm such as data mining, and then predicting the result of a future actions in a similar situation, using the extracted information or knowledge as the experience base. At this time, the machine learning may use various self-learning algorithms, and the operation performance of the machine learning can be improved as data and experiences are accumulated with the elapse of time.

SUMMARY

Various embodiments are directed to a data processing system capable of predicting operations of a plurality of memory systems by performing AI computations on commands and addresses transferred from the respective memory systems from a host, and controlling operation modes of the respective memory systems according to the prediction result, thereby managing power consumption of the entire memory system.

In an embodiment, a data processing system may include one or more first memory systems each comprising a first memory device, and suitable for generating analysis information by performing AI (Artificial Intelligence) computations in order to analyze operation patterns for a plurality of accumulated commands transferred from a host and a plurality of accumulated addresses corresponding to the accumulated commands, and one or more second memory systems each comprising a second memory device having a lower operating speed than the first memory device, and suitable for selectively blocking access to the second memory device in response to the analysis information.

The first and second memory devices may have a volatile characteristic, the data processing system may further include one or more third memory systems each comprising a third memory device having a lower operating speed than the second memory device and a nonvolatile characteristic, and suitable for selectively blocking a power supply to the third memory device in response to the analysis information.

When the result of the AI computation performed on the accumulated commands and the accumulated addresses is predicted as a first period in which a data transfer bandwidth with the host is equal to or less than a first reference value, the first memory system may generate the analysis information whose value is set for the second memory system to block access to the second memory device.

When the result of the AI computation performed on the accumulated commands and the accumulated addresses is predicted as a second period in which a data transfer bandwidth with the host exceeds a first reference value, the first memory system may generate the analysis information whose value is set for the second memory system to permit access to the second memory device.

The first memory system may control the first memory device to process access request data from the host in response to a command and address transferred from the host in each of the first and second periods.

The second memory system may enter a sleep mode for performing an operation of retaining data stored in the second memory device in response to the analysis information corresponding to the entry into the first period, and then may inform the host of the entry into the sleep mode.

The second memory system may exit from the sleep mode in response to the analysis information corresponding to the entry into the second period, may inform the host of the exit from the sleep mode, and may control the second memory device to process the access request data from the host in response to the command and address transferred from the host.

When first cold data whose access frequency from the host is equal to or less than a second reference value, among the data stored in the first memory device, is checked in the first period, the first memory system may generate the analysis information whose value is set for the second memory system to permit access to the second memory device during a third period, may transfer the first cold data to the second memory system in the third period, and then may remove the first cold data from the first memory device.

The second memory system may exit from the sleep mode in response to the analysis information corresponding to the entry into the third period, may store the first cold data transferred form the first memory system in the second memory device, may enter the sleep mode in response to completion of the storing of the first cold data, and may not inform the host of the exit from/entry into the sleep mode in the third period.

When the result of the AI computation performed on the accumulated commands and the accumulated addresses is predicted as a fourth period in which the frequency of accesses to the third memory system from the host is equal to or less than a third reference value, the first memory system may generate the analysis information whose value is set for the third memory system to block power supply to the third memory device.

When the result of the AI computation performed on the accumulated commands and the accumulated addresses is predicted as a fifth period in which the frequency of accesses to the third memory system from the host exceeds the third reference value, the first memory system may generate the analysis information whose value is set for the third memory system to permit power supply to the third memory device.

The third memory system may enter the sleep mode for blocking the power supply to the third memory device in response to the analysis information corresponding to the entry into the fourth period, and may enter a normal mode for permitting power supply to the third memory device in response to the analysis information corresponding to the entry into the fifth period, when a command and address are transferred from the host while the third memory system maintains the sleep mode, the third memory system may exit from the sleep mode only while the third memory device processes access request data corresponding to the transferred command and address, and may reenter the sleep mode after the third memory device processes the access request data.

When second cold data whose access frequency from the host is equal to or less than a fourth reference value, among the data stored in the first memory device, is checked in a sixth period in which the first and fourth periods overlap each other, the first memory system may generate the analysis information whose value is set for the second and third memory systems to permit access to the second memory device and power supply to the third memory device, respectively, during a seventh period, may transfer the second cold data to the third memory system during the seventh period, and then may remove the second cold data from the first memory device.

The second memory system may exit from the sleep mode in response to the analysis information corresponding to the entry into the seventh period, may transfer the second cold data to the third memory system and removes the second cold data from the second memory device when the second cold data is checked among the data stored in the second memory device, may enter the sleep mode in response to completion of the removing of the second cold data, and may not inform the host of the exit from/entry into the sleep mode in the seventh period.

The third memory system may exit from the sleep mode in response to the analysis information corresponding to the entry into the seventh period, stores the second cold data, transferred from at least one of the first and second memory systems, in the third memory device, and may enter the sleep mode in response to completion of the storing of the second cold data.

Whether to enter each of the first and second periods before the analysis information is first generated by the first memory system may be determined according to an absolute time flow and a request of the host, and whether to enter each of the first and second periods after the analysis information is first generated by the first memory system may be determined according to the result of the AI computation and a request of the host.

Whether to enter each of the fourth and fifth periods before the analysis information is first generated by the first memory system may be determined according to a request of the host and information on whether the third memory system is in an idle state, and whether to enter each of the fourth and fifth periods after the analysis information is first generated by the first memory system may be determined according to the result of the AI computation and a request of the host.

The first memory system may further include a fourth memory device having a nonvolatile characteristic, may generate the accumulated commands and the accumulated addresses by accumulating and storing source information on commands and addresses, transferred from the host to the first to third memory systems, in the fourth memory device, may generate the analysis information by performing AI computation on the accumulated commands and the accumulated addresses, and may store the generated analysis information in the fourth memory device.

The source information may include type information, relation information, input point information and input sequence information of the commands transferred from the host to the first to third memory systems, and may include location information of the addresses transferred from the host to the first to third memory systems, location distance information, and location change information.

The first memory system may generate the analysis information by performing AI computations on the accumulated commands and the accumulated addresses in an eighth period in which it is predicted that the frequency of accesses to the first memory system from the host will be equal to or less than a fifth reference value.

Whether to enter the eighth period before the analysis information is first generated by the first memory system may be determined according to a request of the host and information on whether the first memory system is in an idle state, and whether to enter the eighth period after the analysis information is first generated by the first memory system may be determined according to the result of the AI computation and a request of the host.

Each of the first to third memory systems may include a first interface and a second interface, the first to third memory systems may be coupled to the host through the first interface, and coupled to one another through the second interface.

The first memory system may further include a third interface, and may be coupled to the fourth memory device through the third interface.

In accordance with the present embodiment, the data processing system including the host and the plurality of memory systems may accumulate commands and addresses transferred from the host to the respective memory systems, and perform a AI computation on the accumulated commands and addresses, in order to predict future operations for the commands and addresses transferred to the respective memory systems from the host. Based on the prediction result, the data processing system can control the operation modes of the respective memory systems, thereby minimizing power consumption of the entire memory systems.

BRIEF DESCRIPTION OF THE DRAWINGS

FIGS. 3A to 3C are flowcharts for describing an operation of a first memory system among components of the data processing systems in accordance with the present embodiment, which are illustrated in FIGS. 2A and 2B.

FIG. 4 is a flowchart for describing an operation of a second memory system among the components of the data processing systems in accordance with the present embodiment, which are illustrated in FIGS. 2A and 2B.

DETAILED DESCRIPTION

Figure 1:
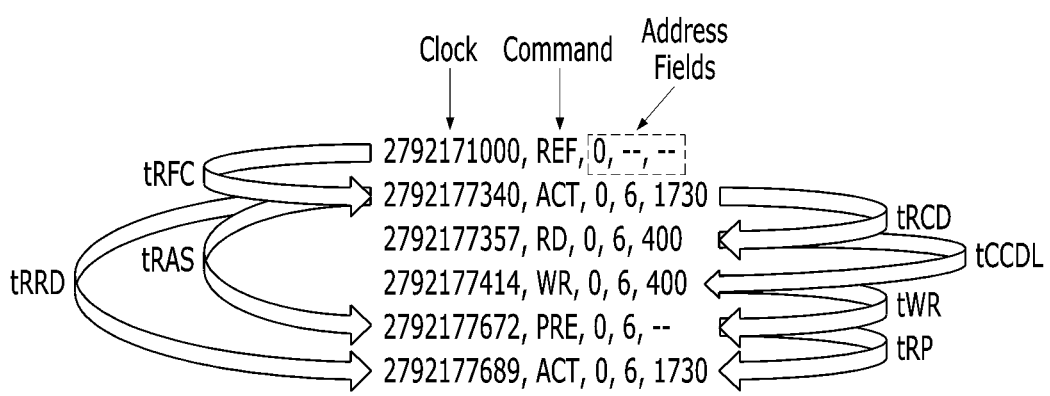
FIG. 1 is a diagram for describing operation patterns for a plurality of commands used in a memory device.

FIG. 1 is a diagram for describing operation patterns for a plurality of commands used in a memory device.

The memory device illustrated in FIG. 1 is a DRAM (Dynamic Random Access Memory), and a plurality of commands may also be used in a volatile memory device such as an SRAM (Static RAM) or a nonvolatile memory device such as a ROM (Read Only Memory), MROM (Mask ROM), PROM (Programmable ROM), EPROM (Erasable ROM), EEPROM (Electrically Erasable ROM), FRAM (Ferromagnetic ROM), PRAM (Phase change RAM), MRAM (Magnetic RAM), RRAM (Resistive RAM) or flash memory, in a similar manner to the DRAM illustrated in FIG. 1.

Referring to FIG. 1, the types of the commands used in the memory device may include a refresh command REF, an active command ACT, a read command RD, a write command WR and a precharge command PRE. The refresh command REF may be a command for controlling a refresh operation of the DRAM. The active command ACT and the precharge command PRE may be commands for controlling an active operation and a precharge operation of the DRAM. The read command RD and the write command WR may be commands for controlling a read operation and a write operation of the DRAM.

Furthermore, a clock CLOCK may have various values (for example, 2792171000, 2792177340, 2792177357, 2792177414, 2792177672 and 2792177689) which indicate the input points and input sequence of the plurality of commands. For example, the information on the input points and input sequence of the commands may be defined through a plurality of parameters tRFC, tRAS, tRRD, tRCD, tCCDL, tWR and tRP illustrated in FIG. 1, based on two commands being inputted at different points of time.

Each of the commands may include address information ADDRESS FIELDS corresponding to the command. Here, the values of the address information ADDRESS FIELDS (for example, 0,--,--/0,6,1730/0,6,400/0,6,400/0,6,--/0,6, 1730) may represent information on a location indicated by an address, a location distance and a location change. Here, '--' in the address information indicates that specific address information may not be included, depending on the types of the commands.

As described above, the plurality of commands used in the memory device may be divided into various operation patterns, depending on the input points, types and input sequence of the commands. Furthermore, through the values of the respective pieces of address information corresponding to the plurality of commands, the commands may be divided into various operation patterns. For example, the value of the address information may indicate which location of the memory device the corresponding command is to access and how a location distance and location change occurred depending on a difference of the input point.

The various operation patterns which can be classified through the plurality of commands may be large in number, and expanded or changed in an unpredictable manner, depending on operation environments of the memory device. For example, the iteration number or iteration interval of refresh operations may be changed depending on the lifetime of the memory device.

For this reason, attempts to implement a method for accumulating a plurality of commands and then predicting a future operation of a memory device by analyzing operation patterns for the accumulated commands have been continuously made. However, there is a limitation in analyzing operation patterns for a plurality of accumulated commands according to a method pre-defined by a designer.

Therefore, the present embodiment suggests an operation of predicting a future operation of a memory device by analyzing operation patterns for a plurality of accumulated commands through an AI computation and managing power consumption of a memory system including a memory device and a data processing system including a plurality of memory systems according to the prediction result.

The AI computation suggested by the present embodiment may use a clustering algorithm. That is, when a sufficient number of commands are accumulated in a memory device, operation patterns for the accumulated commands may be grouped into a plurality of clusters by grouping the operation patterns for the accumulated commands through the clustering algorithm such that the operation patterns having similar characteristics cluster together through the clustering algorithm. The plurality of clusters of the operation patterns may correspond to a plurality of clusters of the accumulated and corresponding commands.

After the plurality of clusters are configured, it is possible to identify a particular operation pattern cluster to which an operation pattern for a subsequently provided command is to belong. That is, the operation patterns for the accumulated commands may be divided into the plurality of clusters through the clustering algorithm. Then, an operation pattern for a subsequently provided command can be determined to belong to a particular one among the plurality of clusters of the operation patterns.

For example, in the case of a memory device that has accumulated 11,340 commands, the operation patterns for the 11,340 commands may be divided into 97 clusters through the k-means clustering algorithm. After the operation patterns are divided into 97 clusters, it is possible to predict a future operation of the memory device by identifying a particular operation pattern cluster to which an operation pattern for a subsequently provided command is to belong.

For reference, the clustering operation in the AI computation suggested by the present embodiment may include different types of clustering operations such as hierarchical clustering as well as the k-means clustering. Furthermore, the AI computation suggested by the present embodiment is not limited to the clustering operation, but may include different types of AI computations.

The types of commands exemplified in FIG. 1, i.e. the refresh command REF, the active command ACT, the read command RD, the write command WR and the precharge command PRE, may be based on the type of the memory device being a DRAM. Therefore, when the memory device is not a DRAM but a different type of memory, different types of commands may be used. However, regardless of the types of memory devices, plural types of commands may be used as illustrated in FIG. 1. Therefore, the idea of the present embodiment that predicts a future operation of the memory device by analyzing operation patterns for a plurality of accumulated commands through AI computation may not be limited to the types of memory devices.

Figure 2A:
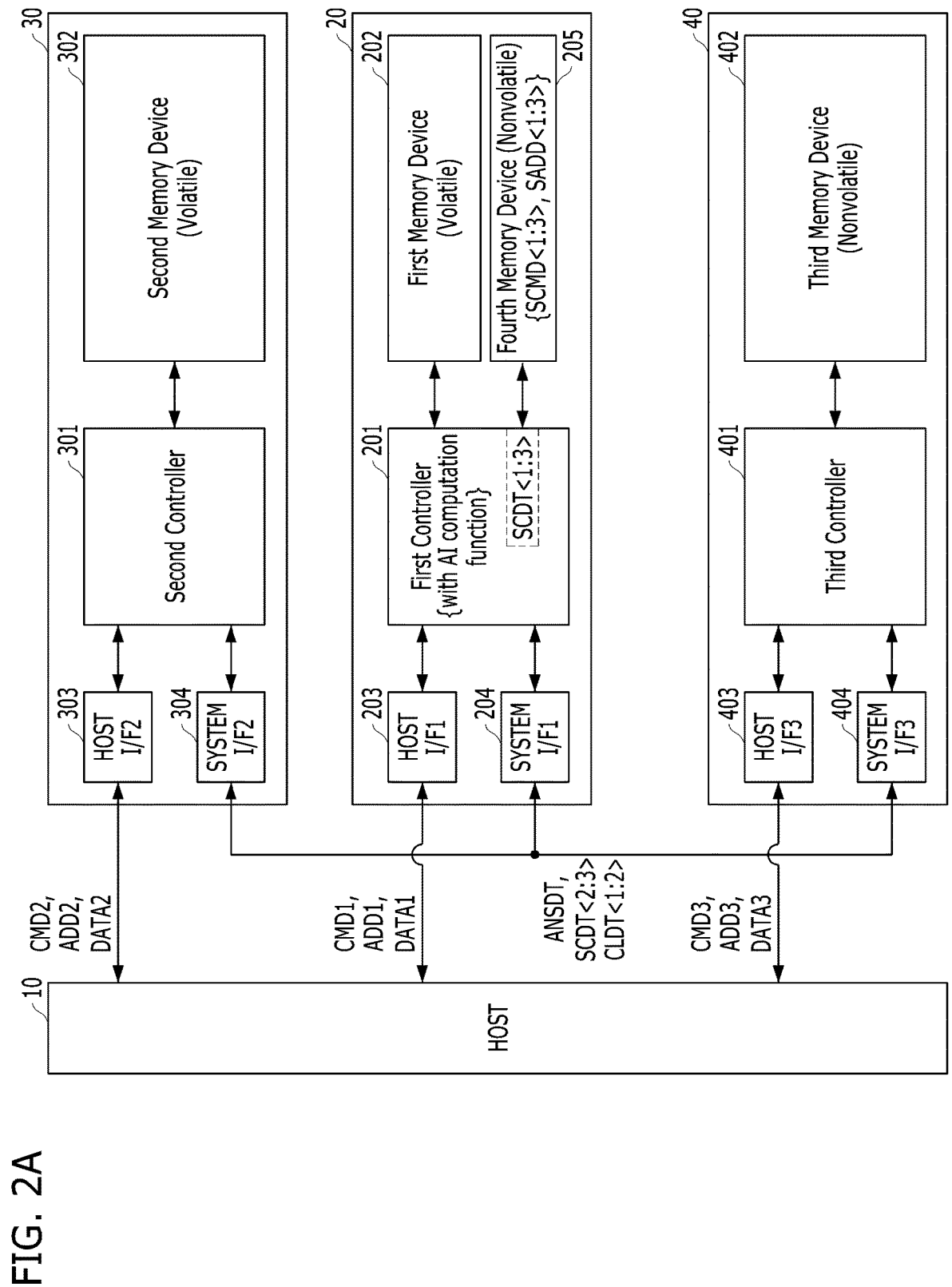
FIG. 2A is a diagram illustrating an example of a data processing system in accordance with an embodiment.

FIG. 2A is a diagram illustrating an example of a data processing system in accordance with an embodiment.

Figure 2B:
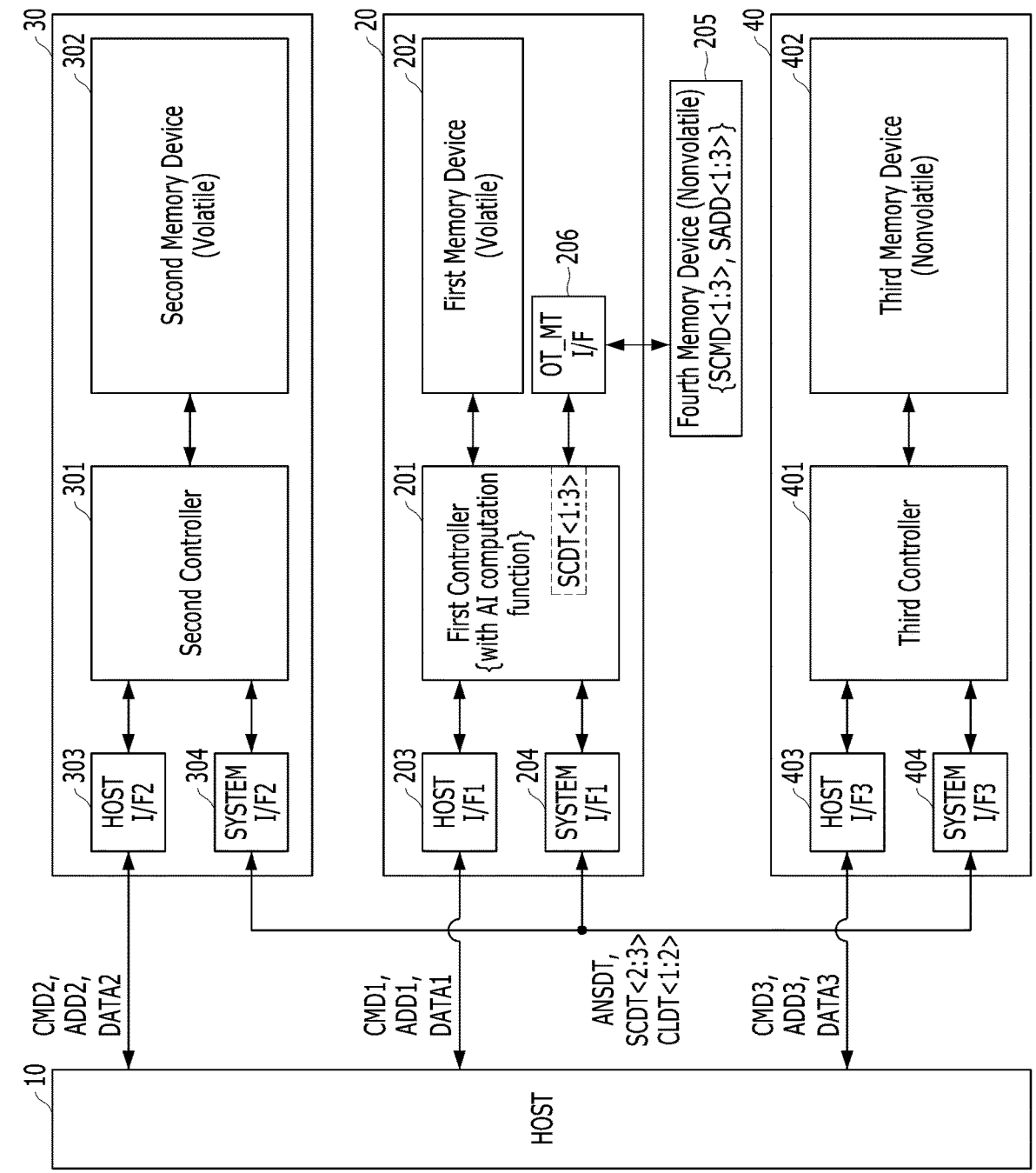
FIG. 2B is a diagram illustrating another example of the data processing system in accordance with the present embodiment.

FIG. 2B is a diagram illustrating another example of the data processing system in accordance with the present embodiment.

First, referring to FIG. 2A, the data processing system in accordance with the present embodiment may include a host 10 and a plurality of memory systems 20, 30 and 40. The plurality of memory systems 20, 30 and 40 may include one or more first memory systems 20, one or more second memory systems 30 and one or more third memory systems 40. For reference, FIGS. 2A and 2B illustrate that the data processing system includes one first memory system 20, one second memory system 30 and one third memory system 40, but this is only an example for convenience of description. In various embodiments, a larger number of first to third memory systems 20, 30 and 40 may be included in the data processing system.

Specifically, the first memory system 20 may include a first memory device 202, and generate analysis information ANSDT by performing an AI computation in order to analyze operation patterns for a plurality of accumulated commands SCMD<1:3> transferred from the host 10 and accumulated addresses SADD<1:3> corresponding to the accumulated commands SCMD<1:3>. Furthermore, the first memory system 20 may further include a first controller 201, a fourth memory device 205, a first host interface 203 and a first system interface 204.

The second memory system 30 may include a second memory device 302, and selectively block access to the second memory device 302 in response to the analysis information ANSDT generated by the first memory system 20. Furthermore, the second memory system 30 may further include a second controller 301, a second host interface 303 and a second system interface 304.

The third memory system 40 may include a third memory device 402, and selectively remove power supplied to the third memory device 402 in response to the analysis information ANSDT generated by the first memory system 20. Furthermore, the third memory system 40 may further include a third controller 401, a third host interface 403 and a third system interface 404.

Specifically, the first controller 201 included in the first memory system 20 may control an operation of the first memory device 202 in response to a request from the host 10. For example, the first controller 201 may transfer data read from the first memory device 202 to the host 10 in response to a read command transferred from the host 10, and store data transferred from the host 10 in the first memory device 202 in response to a write command transferred from the host 10.

Similarly, the second controller 301 included in the second memory system 30 may control an operation of the second memory device 302 in response to a request from the host 10. For example, the second controller 301 may transfer data read from the second memory device 302 to the host 10 in response to a read command transferred from the host 10, and store data transferred from the host 10 in the second memory device 302 in response to a write command transferred from the host 10.

Furthermore, the third controller 401 included in the third memory system 40 may control an operation of the third memory device 402 in response to a request from the host 10. For example, the third controller 401 may transfer data read from the third memory device 402 to the host 10 in response to a read command transferred from the host 10, and store data transferred from the host 10 in the third memory device 402 in response to a write command transferred from the host 10.

The first memory device 202 included in the first memory system 20 may have a higher operating speed than the second memory device 302 included in the second memory system 30. That is, the first memory device 202 may write and read data at a higher speed than the second memory device 302. The second memory device 302 may have a higher operating speed than the third memory device 402 included in the third memory system 40. That is, the second memory device 302 may write and read data at a higher speed than the third memory device 402. The first and second memory devices 202 and 302 may be volatile memory devices. The third memory device 402 may be a nonvolatile memory device.

For example, the first and second memory devices 202 and 302 may be volatile memory devices such as a DRAM and SRAM. The third memory device 402 may a nonvolatile memory device such as a ROM, MROM, PROM, EPROM, EEPROM, FRAM, PRAM, MRAM, RRAM or flash memory.

The first host interface 203 included in the first memory system 20 is a component for coupling the first memory system 20 to the host 10, and may perform an operation of transferring a command CMD1, an address ADD1 and data DATA1 between the first memory system 20 and the host 10.

Similarly, the second host interface 303 included in the second memory system 30 is a component for coupling the second memory system 30 to the host 10, and may perform an operation of transferring a command CMD2, an address ADD2 and data DATA2 between the second memory system 30 and the host 10.

Furthermore, the third host interface 403 included in the third memory system 40 is a component for coupling the third memory system 40 to the host 10, and may perform an operation of transferring a command CMD3, an address ADD3 and data DATA3 between the third memory system 40 and the host 10.

The first to third memory systems 20, 30 and 40 may be directly coupled to one another, and transfer/receive various pieces of information or data ANSDT, SCDT<2:3> or CLDT<1:2> to/from one another without passing through the host 10.

That is, the first system interface 204 included in the first memory system 20 is a component for coupling the first memory system 20 to the second and third memory systems 30 and 40, and may perform an operation of transferring analysis information ANSDT, source information SCDT<2:3> and cold data CLDT<1:2> between the first memory system 20 and the second and third memory systems 30 and 40.

Similarly, the second system interface 304 included in the second memory system 30 is a component for coupling the second memory system 30 to the first and third memory systems 20 and 40, and may perform an operation of transferring the analysis information ANSDT, the source information SCDT<2:3> and the cold data CLDT<1:2> between the second memory system 30 and the first and third memory systems 20 and 40.

Furthermore, the third system interface 404 included in the third memory system 40 is a component for coupling the third memory system 40 to the first and second memory systems 20 and 30, and may perform an operation of transferring the analysis information ANSDT, the source information SCDT<2:3> and the cold data CLDT<1:2> between the third memory system 40 and the first and second memory systems 20 and 30.

The first controller 201 included in the first memory system 20 may include a device, circuit or program capable of performing an AI computation. For example, although not illustrated in the drawings, the first controller 201 may include a processor capable of performing an AI computation. That is, the first controller 201 may include a device, circuit or program capable of performing an AI computation, and thus perform the AI computation in order to analyze operation patterns for a plurality of accumulated commands SCMD<1:3> transferred from the host 10 and accumulated addresses SADD<1:3> corresponding to the plurality of accumulated commands SCMD<1:3>. The plurality of accumulated commands SCMD<1:3> and accumulated addresses SADD<1:3>, which are the target of the AI computation, may be generated by accumulating source information SCDT<1> on a command CMD1 and address ADD1 transferred from the host 10 to the first memory system 20, source information SCDT<2> on a command CMD2 and address ADD2 transferred from the host 10 to the second memory system 30, and source information SCDT<3> on a command CMD3 and address ADD3 transferred from the host 10 to the third memory system 40. That is, the first controller 201 may generate the accumulated commands SCMD<1:3> and accumulated addresses SADD<1:3> by accumulating the source information SCDT<2:3> on the commands CMD<2:3> and addresses ADD<2:3> transferred from the host 10 to the second and third memory systems 30 and 40, respectively, as well as the source information SCDT<1> on the command CMD1 and address ADD1 transferred from the host 10 to the first memory system 20 including the first controller 201, and then perform the AI computation in order to analyze operation patterns for the generated accumulated commands SCMD<1:3> and accumulated addresses SADD<1:3>. The second and third memory systems 30 and 40 may provide the first controller 201 with the source information SCDT<2:3> on the commands CMD<2:3> and addresses ADD<2:3> transferred from the host 10.

The source information SCDT<1:3> on the commands transferred from the host 10 to the first to third memory systems 20, 30 and 40, respectively, may include type information indicating the types of the commands CMD<1:3> transferred from the host 10 to the first to third memory systems 20, 30 and 40, respectively, relation information indicating the relationship between each of the transferred commands and the other commands, input point information indicating the absolute or relative points of time that the transferred commands were inputted, and input sequence information indicating the absolute or relative sequence in which the transferred commands were inputted. The relationship between each of the transferred commands and the other commands may indicate that each of the other commands is inputted before or after the point of time that the transferred command is inputted.

The source information SCDT<1:3> on the commands transferred from the host 10 to the first to third memory systems 20, 30 and 40, respectively, may include location information indicating absolute or relative locations indicated by the addresses transferred from the host 10 to the first to third memory systems 20, 30 and 40, location distance information indicating absolute or relative location differences between each of the transferred addresses and the other addresses, and location change information indicating absolute or relative location changes between each of the transferred addresses and the other addresses. The relationship between each of the transferred addresses and the other addresses may indicate that each of the other addresses is inputted before or after the point of time that the transferred address is inputted.

In short, the first controller 201 may not only perform an operation of controlling an operation of the first memory device 202 according to a request from the host 10, but also generate the accumulated commands SCMD<1:3> and accumulated addresses SADD<1:3> by accumulating the source information SCDT<1:3> on the plurality of commands CMD<1:3> and addresses ADD<1:3> transferred from the host 10 to the first to third memory systems 20, and 40, and generate the analysis information ANSDT by performing an AI computation in order to analyze operation patterns for the accumulated commands SCMD<1:3> and accumulated addresses SADD<1:3>.

The fourth memory device 205 included in the first memory system 20 may be used to store data which serve as source data when the first controller 201 performs the AI computation, i.e. the accumulated commands SCMD<1:3> and accumulated addresses SADD<1:3>. Furthermore, the fourth memory device 205 included in the first memory system 20 may be used to store data generated as a result of the AI computation performed by the first controller 201, i.e. the analysis information ANSDT. The first controller 201 may control an operation of the fourth memory device 205 regardless of a request from the host 10. That is, the fourth memory device 205 is a memory device which is exclusively used by the first controller 201, and the host 10 may not know the presence of the fourth memory device 205.

The fourth memory device 205 may be a memory device having a nonvolatile characteristic. That is, even when the first memory system 20 is powered off, the information or data ANSDT, CMD<1:3> or ADD<1:3> which are stored in the fourth memory device 205 and used for AI computation may not be erased. Thus, the information or data ANSDT, CMD<1:3> or ADD<1:3> used for the AI computation may be accumulated and stored in the fourth memory device 205, regardless of a power-on/off of the first memory system 20. That is, the longer the operation time, the more the information or data may be generated.

FIG. 2B illustrates that the fourth memory device 205 is coupled from the outside of the first memory system 20, unlike the configuration of FIG. 2A. That is, the first memory system 20 may include a separate interface 206 therein, and be coupled to the fourth memory device 205 through the interface 206.

In short, as illustrated in FIG. 2A, the fourth memory device 205 may be included in the first memory system 20 and operate. Also, as illustrated in FIG. 2B, the fourth memory device 205 may be coupled to the first memory system 20 from the outside of the first memory system 20 and operate.

The analysis information ANSDT generated by the first controller 201 may be transferred to the second and third controllers 301 and 401. The second controller 301 may selectively block access to the second memory device 302 in response to the analysis information ANSDT. The third controller 401 may selectively block the power supply to the third memory device 402 in response to the analysis information ANSDT.

Since the second memory device 302 is a memory device having a volatile characteristic, the second controller 301 may block access to the second memory device 302, and thus reduce power consumption of the second memory device 302. For example, the second controller 301 may block access to the second memory device 302 through an operation of controlling the second memory device 302 to enter a sleep mode. The second memory device 302 having entered the sleep mode may perform only an operation of retaining data stored therein, for example, a refresh operation. In this case, the second memory device 302 may consume much less power than when performing an access operation of reading/writing data.

Since the third memory device 402 is a memory device having a nonvolatile characteristic, the third controller 401 may block the power supply to the third memory device 402, such that the third memory device 402 does not consume power. In order to perform an access operation of reading/writing data while the power supply to the third memory device 402 is blocked, an additional operation of resuming the power supply is required. Thus, it may take a longer time than when an access operation is performed while the power supply is not blocked.

Figure 3B:
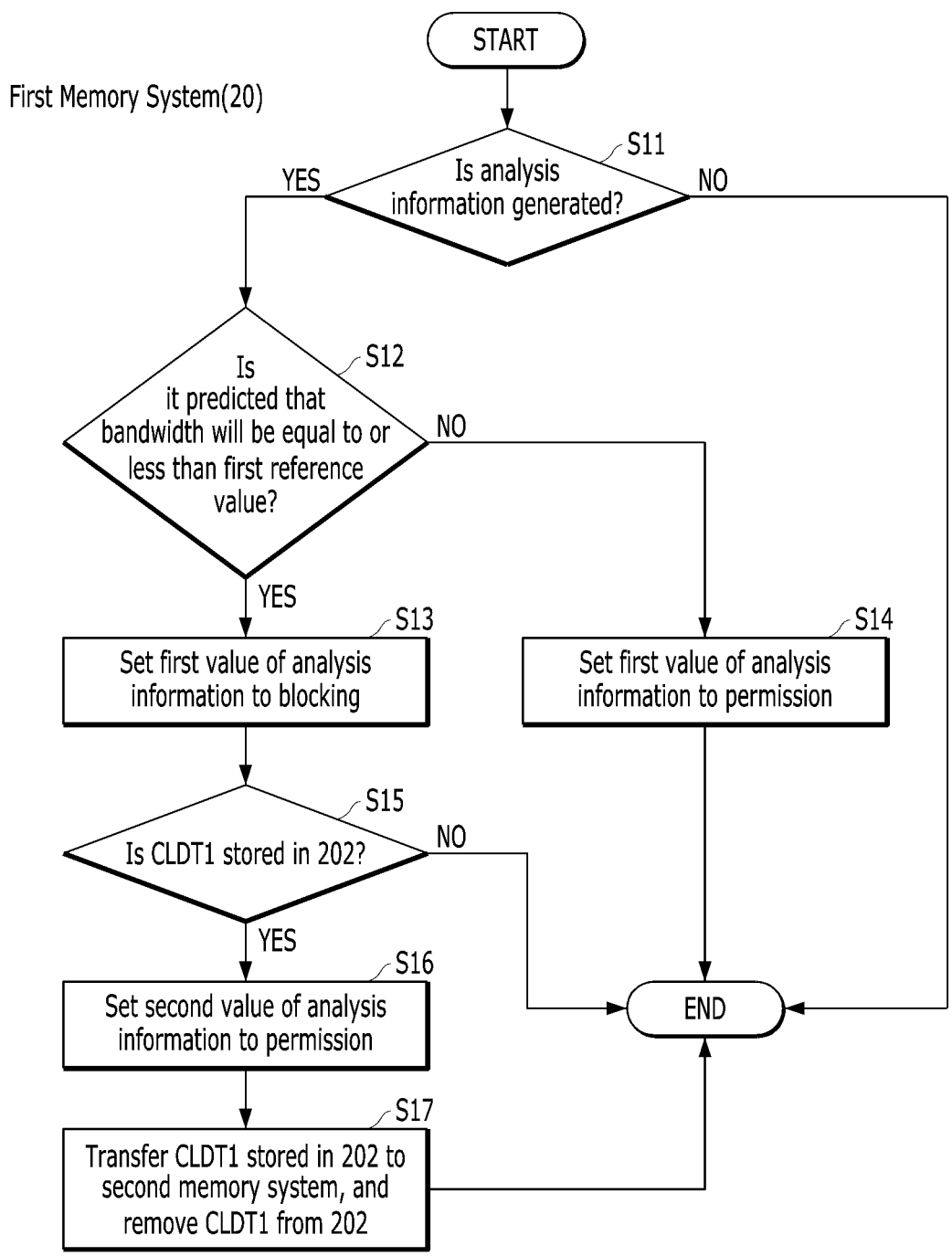
Figure 3C:
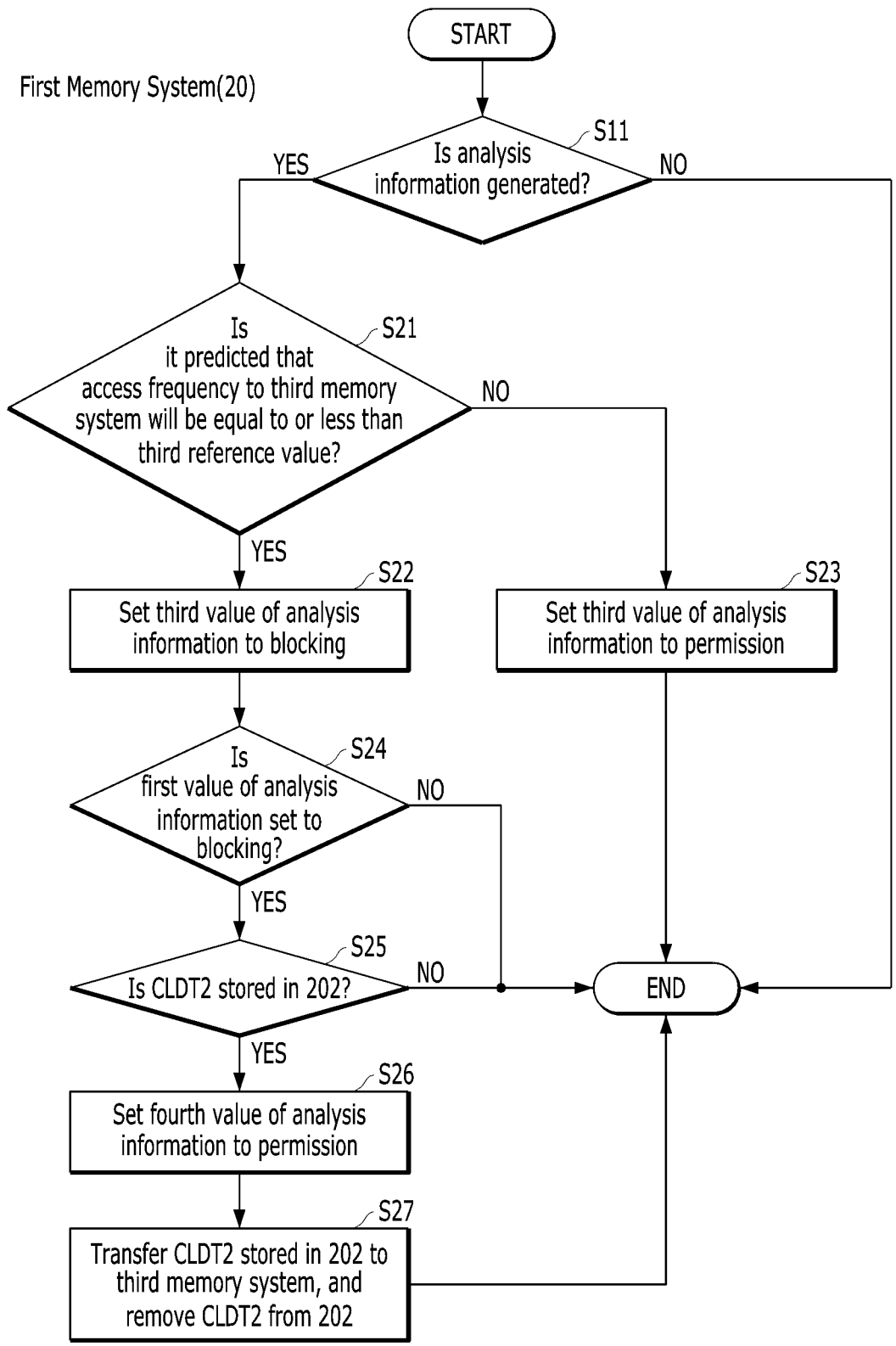

FIGS. 3A to 3C are flowcharts for describing an operation of the first memory system among the components of the data processing systems in accordance with the present embodiment, which are illustrated in FIGS. 2A and 2B.

Referring to all of FIGS. 3A to 3C, the first memory system 20 included in the data processing system may generate the accumulated commands SCMD<1:3> and accumulated addresses SADD<1:3> by accumulating the source information SCDT<1:3> on the commands CMD<1:3> and addresses ADD<1:3> transferred from the host 10 to the first to third memory systems 20, 30 and 40, respectively, and then may generate the analysis information ANSDT by performing an AI computation in order to analyze operation patterns for the accumulated commands SCMD<1:3> and accumulated addresses SADD<1:3>.

As described above, the first memory system 20 may first generate the accumulated commands SCMD<1:3> and accumulated addresses SADD<1:3>, and then generate the analysis information ANSDT by using the generated accumulated commands SCMD<1:3> and accumulated addresses SADD<1:3>. Furthermore, when a sufficient number of pieces of source information SCDT<1:3> on the commands CMD<1:3> and addresses ADD<1:3> transferred from the host 10 to the first to third memory systems 20, 30 and 40 are accumulated, the first memory system 20 may generate the accumulated commands SCMD<1:3> and accumulated addresses SADD<1:3>. Therefore, until a sufficient number of pieces of source information SCDT<1:3> on the commands CMD<1:3> and addresses ADD<1:3> transferred from the host 10 to the first to third memory systems 20, 30 and 40 are accumulated, the first memory system 20 may not generate the analysis information ANSDT.

When the first memory system 20 generates the analysis information ANSDT by performing an AI computation, it may indicate that future operations of the first to third memory systems 20, 30 and 40 are predicted through the AI computation. Therefore, after the first memory system 20 generates the analysis information ANSDT, the operations of the first to third memory systems 20, 30 and 40 may be controlled based on the future operations predicted through the AI computation.

On the other hand, when the first memory system 20 does not generate the analysis information ANSDT, it may indicate that future operations of the first to third memory systems 20, 30 and 40 are not predicted. Therefore, until the first memory system 20 generates the analysis information ANSDT, the operations of the first to third memory systems 20, 30 and 40 may be controlled according to a pre-arranged sequence, pattern or condition.

Specifically, referring to FIG. 3A, the first memory system 20 may control an operation of the first memory device 202 included therein, in response to the first command CMD1 and first address ADD1 inputted from the host 10, when the analysis information ANSDT is not generated (NO in step S11).

In particular, when the analysis information ANSDT is not generated (NO in step S11), the first memory system 20 may not receive any access request from the host 10. For example, the first memory system 20 may be in an idle state. Therefore, the first memory system 20 may check whether the first memory system 20 is in an idle state when the analysis information ANSDT is not generated (NO in step S11), in step S32. According to the check result, the first memory system 20 may select whether to perform an AI computation. That is, when it is checked that the first memory system 20 is in an idle state (YES in step S32) in the case that the analysis information ANSDT is not generated (NO in step S11), the first memory system 20 may check whether a sufficient number of pieces of source information SCDT<1:3> on the commands CMD<1:3> and addresses ADD<1:3> transferred from the host 10 to the first to third memory systems 20, 30 and 40 have been accumulated, in step S34.

When a sufficient number of pieces of source information SCDT<1:3> are accumulated (YES in step S34), the first memory system 20 may generate the accumulated commands SCMD<1:3> and accumulated addresses SADD<1:3>, and then generate the analysis information ANSDT by performing the AI computation on the accumulated commands SCMD<1:3> and accumulated addresses SADD<1:3>, in step S35. On the other hand, when a sufficient number of pieces of source information SCDT<1:3> are not accumulated (NO in step S34), the first memory system 20 may perform no operations.

When it is checked that the first memory system 20 is not in an idle state but has received an access request from the host 10 (NO in step S32), in the case that the analysis information ANSDT is not generated (NO in step S11), the first memory system 20 needs to process the access request from the host 10, and thus cannot perform the AI computation.

When the analysis information ANSDT is generated (YES in step S11), the first memory system 20 may predict future operations of the first to third to third memory systems 20, 30 and 40. In particular, when the analysis information ANSDT is generated (YES in step S11), the first memory system 20 may check whether it is predicted that the frequency of accesses to the first memory system 20 will be equal to or less than a fifth reference value, in step S31. That is, when the analysis information ANSDT is generated (YES in step S11), the first memory system 20 may check whether it is predicted that the number of access requests from the host 10 to the first memory system 20 in a future operation period from a current time point to a set future time point will be equal to or less than the fifth reference value, by referring to the analysis information ANSDT, in step S31. The operation (S31) of checking whether it is predicted that the number of access requests from the host 10 during the future operation period from the current time point to the set future time will be equal to or less than the fifth reference value may indicate an operation of determining how many operation patterns of the plurality of first commands CMD1 and first addresses ADD1 transferred from the host 10 to the first memory system 20 in a past operation period between a set previous time point and the current time point match with the operation patterns predicted through the analysis information ANSDT. For example, the future operation period from the current time point to the set future time point during which the access requests from the host 10 to the first memory system 20 are predicted may have a relatively large length, when the operation patterns of the plurality of first commands CMD1 and first addresses ADD1 transferred from the host 10 to the first memory system 20 in the past operation period between the set previous time point and the current time point relatively match with the operation patterns predicted through the analysis information ANSDT. That is, the future operation period may depend on the degree of relationship (for example, degree of match) between the operation patterns regarding the first memory system 20 and the operation patterns within the analysis information ANSDT during the past time period.

When it is predicted that the frequency of accesses to the first memory system 20 will be equal to or less than the fifth reference value (YES in step S31), the first memory system 20 may define (i.e., update) the past operation period as an eighth period based on the degree of the relationship between the operation patterns regarding the first memory system 20 and the operation patterns within the analysis information ANSDT during the previous past time period, and check whether a sufficient number of pieces of source information SCDT<1:3> on the commands CMD<1:3> and addresses ADD<1:3> transferred from the host 10 to the first to third memory systems 20, 30 and 40 are accumulated during the updated past operation period, i.e., the eighth period, in step S34. When a sufficient number of pieces of source information SCDT<1:3> are accumulated (YES in step S34), the first memory system 20 may generate the accumulated commands SCMD<1:3> and accumulated addresses SADD<1:3>, and then update the existing analysis information ANSDT by performing an AI computation on the accumulated commands SCMD<1:3> and accumulated addresses SADD<1:3> in step S35. On the other hand, when a sufficient number of pieces of source information SCDT<1:3> are not accumulated (NO in step S34), the first memory system 20 may perform no operations during the eighth period. In this case, the existing analysis information ANSDT may be maintained as it is.

When the analysis information ANSDT is updated, it may indicate that the first memory system 20 has performed the AI computation on more accumulated commands SCMD<1:3> and accumulated addresses SADD<1:3> than the analysis information ANSDT which has been generated before the update, indicates. Therefore, it is highly likely that the first memory system 20 will predict future operations of the first to third memory systems 20, 30 and 40 through the updated analysis information ANSDT more accurately than when the first memory system 20 predicts future operations of the first to third memory systems 20, 30 and 40 through the analysis information ANSDT which has been generated before the update.

When it is predicted that the frequency of accesses to the first memory system 20 will be greater than the fifth reference value (NO in step S31), the first memory system 20 needs to prepare for an access request, which is predicted to be generated by the host 10 during the future operation period according to the prediction of step S31, and thus may perform no operation.

The first memory system 20 may receive a request regarding whether to perform the AI computation from the host 10, regardless of whether the analysis information ANSDT is generated, in step S33. For example, the host 10 may previously know that the first memory system 20 can perform the AI computation. In this case, the host 10 may actively request the first memory system 20 to perform the AI computation in step S33. That is, the host 10 may request the first memory system 20 to perform the AI computation (Permission in step S33) or not to perform the AI computation (Blocking in step S33). In another case, the first memory system 20 may actively provide the host 10 with a request for permission to perform the AI computation and may receive a response to the permission request from the host 10. As the response, the host 10 may provide the first memory system 20 with permission to perform the AI computation (Permission in step S33) or rejection to perform the AI computation (Blocking in step S33).

When the host 10 requests the first memory system 20 to perform an AI computation or permits the first memory system 20 to perform the AI computation (Permission in step S33), the first memory system 20 may check whether a sufficient number of pieces of source information SCDT<1:3> on the commands CMD<1:3> and addresses ADD<1:3> transferred from the host 10 to the first to third memory systems 20, 30 and 40 have been accumulated, in step S34. When a sufficient number of pieces of source information SCDT<1:3> are accumulated (YES in step S34), the first memory system 20 may generate the accumulated commands SCMD<1:3> and accumulated addresses SADD<1:3>, and then generate the analysis information ANSDT by performing AI computation on the accumulated commands SCMD<1:3> and accumulated addresses SADD<1:3> in step S35. When the first memory system 20 performs the AI computation according to the request or permission of the host 10 (step S35) while the analysis information ANSDT is already generated, the first memory system 20 may update the existing analysis information ANSDT. On the other hand, when a sufficient number of pieces of source information SCDT<1:3> are not accumulated (NO in step S34), the first memory system 20 may perform no operations. When the host 10 requests or permits the first memory system 20 to perform the AI computation while the analysis information ANSDT is already generated, the existing analysis information ANSDT may be maintained as it is.

When the host 10 blocks the first memory system 20 from performing the AI computation (Blocking in step S33), the first memory system 20 may perform no operations. When the host 10 blocks the first memory system 20 from performing the AI computation while the analysis information ANSDT is already generated, the existing analysis information ANSDT may be maintained as it is.

Referring to FIG. 3B, the first memory system 20 may perform no operation when the analysis information ANSDT is not generated (NO in step S11).

When the analysis information ANSDT is generated (YES in step S11), the first memory system 20 may check whether it is predicted that a data transfer bandwidth with the host 10 will be equal to or less than a first reference value in a future operation period from a current time point to a set future time point, by referring the analysis information ANSDT, in step S12. The operation (S12) of checking whether it is predicted that the data transfer bandwidth with the host 10 during the future operation period from the current time point to the set future time will be equal to or less than the first reference value may indicate an operation of determining how many operation patterns of the plurality of first commands CMD1 and first addresses ADD1 transferred from the host 10 in the past operation period between a set previous time point and the current time point match with operation patterns predicted through the analysis information ANSDT. For example, the future operation period from the current time point to the set future time point during which the data transfer bandwidth with the host 10 is predicted may have a relatively large bandwidth, when the operation patterns of the plurality of first commands CMD<1:3> and first addresses ADD<1:3> transferred from the host 10 in the past operation period between the set previous time point and the current time point relatively match with the operation patterns predicted through the analysis information ANSDT. That is, the future operation period may depend on the degree of the relationship between the operation patterns regarding the plurality of first commands CMD<1:3> and first addresses ADD<1:3> transferred from the host 10 and the operation patterns within the analysis information ANSDT during the past time period.

When it is predicted that the data transfer bandwidth with the host 10 will be equal to or less than the first reference value (YES in step S12), the first memory system 20 may define (i.e., update) the future operation period as a first period and may set a first value of the analysis information ANSDT to represent "blocking" during the future operation period, i.e., the first period, in step S13. When the first memory system 20 sets the first value of the analysis information ANSDT to represent "blocking" during the future operation period, i.e., the first period in step S13, the second memory system 30 may block access to the second memory device 302 included therein during the future operation period, i.e., the first period. On the other hand, when it is predicted that the data transfer bandwidth with the host 10 will exceed the first reference value (NO in step S12), the first memory system 20 may define the future operation period as a second period and may set the first value of the analysis information ANSDT to represent "permission" during the future operation period, i.e., the second period, in step S14. When the first memory system 20 sets the first value of the analysis information ANSDT to represent "permission" during the future operation period, i.e., the second period in step S14, the second memory system 30 may permit access to the second memory device 302 included therein during the future operation period, i.e., the second period. As described above, the first memory system 20 may control an access operation to the second memory device 302 in the second memory system 30 or adjust the power consumption of the second memory system 30 by adjusting the first value of the analysis information ANSDT according to the prediction result of the data transfer bandwidth with the host 10.

The value of the data transfer bandwidth with the host 10 may indicate the amount or size of data which are transferred between the host 10 and a corresponding memory system at a time. For example, when the size of data which are to be transferred between the host 10 and the memory system is 10 Gigabits, and the maximum transfer size between the host 10 and the memory system is 5 Gigabits, the size of the data which are to be transferred is larger than the maximum transfer size, so the data transfer bandwidth may be set to 5 Gigabits corresponding to the maximum transfer size. For another example, when the size of data which are to be transferred between the host 10 and the memory system is 3 Gigabits, and the maximum transfer size between the host 10 and the memory system is 5 Gigabits, the maximum transfer size is larger than the size of the data which are to be transferred, so the data transfer bandwidth may be set to 3 Gigabits which is less than the maximum transfer size.

Referring to FIGS. 2A and 2B, the first to third memory systems 20, 30 and 40 may be coupled to the host 10 in parallel. That is, each of the first to third memory systems 20, 30 and 40 may independently input/receive data to/from the host 10. Therefore, an independent maximum transfer size may be set between each of the first to third memory systems 20, 30 and 40 and the host 10. The maximum transfer size may indicate the maximum data size which can be written or read during a set time. For example, the first memory system 20 including the first memory device 202 which operates at the highest speed and has a volatile characteristic may have a maximum transfer size of 5 Gigabits in both of the read and write operations. The second memory system 30 including the second memory device 302 which operates at a lower speed than the first memory device 200 but has a volatile characteristic may have a maximum transfer size of 3 Gigabits in both of the read and write operations. The third memory system 40 including the third memory device 402 having a nonvolatile characteristic may have a maximum transfer size of 2 Gigabits in a read operation and have a maximum transfer size of 128 Megabits in a write operation.

Referring back to FIG. 3B, when it is predicted that the data transfer bandwidth with the host 10 will be equal to or less than the first reference value (YES in step S12), it may indicate that it is predicted that the size of data which are to be transferred between the host 10 and the first memory system 20 during a future operation period will be less than the maximum transfer size of the first memory system 20. That is, although the first memory system 20 independently processes data which are to be transferred between the host 10 and the first memory system 20 during the future operation period, the data may be processed without a problem, such as a delay. Therefore, when it is predicted that the data transfer bandwidth with the host 10 will be equal to or less than the first reference value (YES in step S12), the first memory system 20 may define the future operation period as the first period and may set the first value of the analysis information ANSDT to represent "blocking" during the future operation period, i.e., the first period, in step S13, and thus block access to the second memory device 302 in the second memory system 30 during the future operation period, i.e., the first period. Through this operation, the first memory system 20 may process data which are to be processed between the host 10 and the first memory system 20, without a problem, while minimizing power consumption of the second memory system 30 in the future operation period.

On the other hand, when it is predicted that the data transfer bandwidth with the host 10 will exceed the first reference value (NO in step S12), it may indicate that it is predicted that the size of data which are to be transferred between the host 10 and the first memory system 20 during the future operation period will be larger than the maximum transfer size of the first memory system 20. That is, when the first memory system 20 independently processes data which are to be transferred between the host 10 and the first memory system 20 during the future operation period, a problem may occur. For example, data processing may be delayed. Therefore, when it is predicted that the data transfer bandwidth with the host 10 will exceed the first reference value (NO in step S12), the first memory system 20 may define the future operation period as the second period and may set the first value of the analysis information ANSDT to represent "permission" during the second period, in step S14. Thus, the first memory system 20 may permit access to the second memory device 302 in the second memory system 30 during the second period. Through this operation, the first memory system 20 and the second memory system 30 can process data which are to be processed between the host 10 and the first memory system 20.

Meanwhile, regardless of whether the first memory system 20 predicts that the data transfer bandwidth with the host 10 will be equal to or less than the first reference value (YES in step S12) and thus defines the future operation period as the first period, or whether the first memory system 20 predicts that the data transfer bandwidth with the host 10 will exceed the first reference value (NO in step S12) and thus defines the future operation period as the second period, the first memory system 20 still needs to cope or respond to an access request from the host 10. That is, the first memory system 20 may control the first memory device 202 to process access-requested data from the host 10 in response to the first command CMD1 and first address ADD1 transferred from the host 10 in the future operation period.

When the first value of the analysis information ANSDT is set to represent "blocking" in step S13 and the future operation period is defined as the first period, the first memory system 20 may check whether first cold data CLDT1, to which the access frequency from the host 10 is equal to or less than a second reference value, is included in the data stored in the first memory device 202, in step S15.

When the first cold data CLDT1 is included in the data stored in the first memory device 202 (YES in step S15), the first memory system 20 may define a third period, which is a sub-period within the future operation period, i.e., the first period and may set a second value of the analysis information ANSDT to represent "permission" such that the second memory system 30 permits access to the second memory device 302 even within the future operation period of "blocking", in step S16. Then, the first memory system 20 may transfer the first cold data CLDT1 stored in the first memory device 202 to the second memory system 30 in the third period, and then remove the first cold data CLDT1 from the first memory device 202. That is, when it is checked that the first cold data CLDT1 is stored in the first memory device 202 in the future operation period of "blocking", i.e., the first period, the first memory system 20 may set the second value of the analysis information ANSDT to represent "permission" for moving the first cold data CLDT1 to the second memory device 302, such that the second memory system 30 permits access to the second memory device 302 during the third period within the future operation period of "blocking", i.e., the first period.

In this way, when the first memory system 20 sets the second value of the analysis information ANSDT to represent "permission" for the third period in step S16, the second memory system 30 may permit access to the second memory device 302 included therein during the third period. That is, the second memory system 30 may temporarily permit, during the third period within the future operation period of "blocking", i.e., the first period, the access to the second memory device 302, which has been blocked due to the entry into the future operation period of "blocking", i.e., the first period. That is, the second memory system 30 may enter the third period by permitting access to the second memory device 302 and the first memory system 20 may set the second value of the analysis information ANSDT to represent "permission". Then, the second memory system 30 may store, during the third period within the future operation period of "blocking", i.e., the first period, the first cold data CLDT1 transferred from the first memory system 20 in the second memory device 302. After completion of the transfer of the first cold data CLDT1 from the first memory system 20 to the second memory system 30, the second memory system 30 may exit from the third period by entering the sleep mode for blocking access to the second memory device 302.

On the other hand, when the first cold data CLDT1 is not included in the data stored in the first memory device 202 in the first period (NO in step S15), the first memory system 20 may continuously maintain the state in which the first value of the analysis information ANSDT is set to represent "blocking" in the first period in step S13.

Referring to FIG. 3C, the first memory system 20 may perform no operation when the analysis information ANSDT is not generated (NO in step S11).

When the analysis information ANSDT is generated (YES in step S11), the first memory system 20 may check whether it is predicted that the frequency of accesses to the third memory system 40 will be equal to or less than a third reference value in step S21. That is, when the analysis information ANSDT is generated (YES in step S11), the first memory system 20 may check whether it is predicted that the number of access requests from the host 10 to the third memory system 40 in a future operation period from a current time point to a set future time point will be equal to or less than the third reference value, by referring to the analysis information ANSDT, in step S31. The operation (S21) of checking whether it is predicted that the frequency of accesses to the third memory system 40 during the future operation period from the current time point to the set future time will be equal to or less than the third reference value may indicate an operation of determining how many operation patterns of the plurality of third commands CMD3 and third addresses ADD3 transferred from the host 10 to the third memory system 40 in the past operation period between a set previous time point and the current time point match with operation patterns predicted through the analysis information ANSDT. For example, the future operation period from the current time point to the set future time point during which the access requests from the host 10 to the third memory system 40 is predicted may have a relatively large length, when the operation patterns of the plurality of third commands CMD3 and third addresses ADD3 transferred from the host 10 to the third memory system 40 in the past operation period between the set previous time point and the current time point relatively match with the operation patterns predicted through the analysis information ANSDT. That is, the future operation period may depend on the degree of the relationship between the operation patterns regarding the third memory system 40 and the operation patterns within the analysis information ANSDT during the past time period.

When it is predicted that the frequency of accesses to the third memory system 40 will be equal to or less than the third reference value (YES in step S21), the first memory system 20 may define (i.e., update) the future operation period as a fourth period and may set a third value of the analysis information ANSDT to represent "blocking" during the future operation period, i.e., the fourth period in step S22. When the first memory system 20 sets the third value of the analysis information ANSDT to represent "blocking" during the future operation period, i.e., the fourth period in step S22, the third memory system 40 may block the power supply to the third memory device 402 included therein during the future operation period, i.e., the fourth period. On the other hand, when it is predicted that the frequency of accesses to the third memory system 40 will exceed the third reference value (NO in step S21), the first memory system 20 may define the future operation period as a fifth period and may set the third value of the analysis information ANSDT to represent "permission" during the future operation period, i.e., the fifth period in step S23. When the first memory system 20 sets the third value of the analysis information ANSDT to represent "permission" during the future operation period, i.e., the fifth period in step S23, the third memory system 40 may permit the power supply to the third memory device 402 included therein during the future operation period, i.e., the fifth period. As described above, the first memory system 20 may control the power supply operation for the third memory device 402 in the third memory system 40 or adjust the power consumption of the third memory system 40, by adjusting the third value of the analysis information ANSDT according to the prediction result of the frequency of accesses to the third memory system 40.

Since the third memory device 402 included in the third memory system 40 is a memory device having a nonvolatile characteristic, the third memory device 402 may retain data stored therein, even while the power supply is removed. In order to perform an access operation of reading/writing data while the power supply to the third memory device 402 is removed, an additional operation of resuming the power supply is required. Thus, it may take a longer time than when an access operation is performed while the power supply is not removed.

The first memory system 20 may check whether the first value of the analysis information ANSDT is set to represent "blocking" (step S13 of FIG. 3B) while the third value of the analysis information ANSDT is set to represent "blocking" (step S22), in step S24. That is, the first memory system 20 may check whether both of the first and third values of the analysis information ANSDT are set to represent "blocking". In other words, the first memory system 20 may check whether the future operation period for the second memory system 30 is defined as the first period and the future operation period for the third memory system 40 is defined as the fourth period, in step S24. A sub-period during which the first and fourth periods overlap each other is a sixth period as a part of the future operation period, i.e., the first period or the fourth period.

During the sixth period in which both of the first and third values of the analysis information ANSDT are set to represent "blocking" (YES in step S24), the first memory system 20 may check whether second cold data CLDT2, to which the access frequency from the host 10 is equal to or less than a fourth reference value, is included in the data stored in the first memory device 202, in step S25. The second cold data CLDT2 may be different from the first cold data CLDT1 described with reference to FIG. 3B. For example, the frequency of accesses to the first cold data CLDT1 from the host 10 may be higher than that of the second cold data CLDT2. That is, the access frequency to the second cold data CLDT2 from the host 10 based on the fourth reference value for checking the second cold data CLDT2 may be lower than the access frequency to the second cold data CLDT2 from the host 10 based on the second reference value for checking the first cold data CLDT2.

When the second cold data CLDT2 is included in the data stored in the first memory device 202 in the sixth period (YES in step S25), the first memory system 20 may define a seventh period, which is a sub-period within the sixth period and may set a fourth value of the analysis information ANSDT to represent "permission" such that the second and third memory systems 30 and 40 permit access to the second memory device 302 and the power supply to the third memory device 402, respectively, even within the future operation period of "blocking", in step S26. Then, the first memory system 20 may transfer the second cold data CLDT2 stored in the first memory device 202 to the third memory system 40 in the seventh period, and then remove the second cold data CLDT2 from the first memory device 202, in step S27. That is, when it is checked that the second cold data CLDT2 is stored in the first memory device 202 during the future operation period of "blocking", i.e., the sixth period, the first memory system 20 may set the fourth value of the analysis information ANSDT to represent "permission" for moving the second cold data CLDT2 to the third memory device 402, such that the third memory system 40 permits power supply to the third memory device 402 during the seventh period within the future operation period of "blocking", i.e., the sixth period.

In this way, when the first memory system 20 sets the fourth value of the analysis information ANSDT to represent "permission" for the seventh period in step S26, the second memory system 30 may permit access to the second memory device 302 included therein during the seventh period. That is, the second memory system 30 may temporarily permit, during the seventh period within the future operation period of "blocking", i.e., the sixth period within the first period, access to the second memory device 302, which has been blocked due to the entry into the future operation period of "blocking", i.e., the first period. That is, the second memory system 30 may enter the seventh period by permitting access to the second memory device 302 and the first memory system 20 may set the fourth value of the analysis information ANSDT to represent "permission". Then, the second memory system 30 may check whether the second cold data CLDT2 is stored in the second memory device 302 in the seventh period. When the second cold data CLDT2 is stored in the second memory device 302, the second memory system 30 may transfer, during the seventh period within the future operation period of "blocking", i.e., the sixth period within the first period, the second cold data CLDT2 to the third memory system 40, and then remove the second cold data CLDT2 from the second memory device 302. After completion of the transfer of the second cold data CLDT2 from the second memory system 30 to the third memory system 40, the second memory system 30 may exit from the seventh period by entering the sleep mode for blocking access to the second memory device 302.

In this way, when the first memory system 20 sets the fourth value of the analysis information ANSDT to represent "permission" for the seventh period in step S26, the third memory system 40 may temporarily permit, during the seventh period within the future operation period of "blocking", i.e., the sixth period within the fourth period, the power supply to the third memory device 402 included therein during the seventh period within the future operation period of "blocking", i.e., the sixth period within the fourth period. That is, the third memory system 40 may enter the seventh period by permitting the power supply to the third memory device 402 and the first memory system 20 may set the fourth value of the analysis information ANSDT to represent "permission". Then, the third memory system 40 may store the second cold data CLDT2, transferred from at least one of the first and second memory systems 20 and 30, in the third memory device 402 in the seventh period within the future operation period of "blocking", i.e., the sixth period within the fourth period. After completion of the transfer of the second cold data CLDT2 from at least one of the first and second memory systems 20 and 30 to the third memory system 40, the third memory system 40 may exit from the seventh period by blocking power supply to the third memory device 402.

On the other hand, when the second cold data CLDT2 is not included in the data stored in the first memory device 202 in the sixth period (NO in step S25), the first memory system 20 may continuously maintain the state in which the fourth value of the analysis information ANSDT is set to represent "blocking" in the sixth period.

The first to fifth reference values have no relationship therebetween.

FIG. 4 is a flowchart for describing an operation of the second memory system 30 among the components of the data processing systems in accordance with the present embodiment, which are illustrated in FIGS. 2A and 2B.

Referring to FIG. 4, the second memory system 30 may check whether the analysis information ANSDT is transferred from the first memory system 20, in step S41. When the analysis information ANSDT is not transferred from the first memory system 20 (NO in step S41), the second memory system 30 may control an operation of the second memory device 302 included therein in response to the second command CMD2 and second address ADD2 inputted from the host 10.

The second memory system 30 may check the absolute current time when the analysis information ANSDT is not transferred from the first memory system 20 (NO in step S41), in step S43. The absolute current time may indicate the current time point of time in the absolute time flow. For example, when the current time is 15 o'clock among 24 hours of the day, 15 o'clock may be referred to as the absolute current time.

When the absolute current time is included in a permission time range as the check result of step S43, the second memory system 30 may exit from the sleep mode to permit access to the second memory device 302 therein, and then inform the host 10 of the exit from the sleep mode in step S47. Since the second memory system 30 has informed the host 10 of the exit from the sleep mode, the host 10 may recognize that the second memory system 30 has exited from the sleep mode. Therefore, the host 10 may transfer the second command CMD2 and second address ADD2 to the second memory system 30, and the second memory system 30 may control the operation of the second memory device 302 included therein in response to the second command CMD2 and second address ADD2.

On the other hand, when the absolute current time is included in a blocking time range as the check result of step S43), the second memory system 30 may enter the sleep mode to block access to the second memory device 302 therein, and then inform the host 10 of the entry into the sleep mode in step S46. Since the second memory system 30 has informed the host 10 of the entry into the sleep mode, the host 10 may recognize that the second memory system 30 has entered the sleep mode. Therefore, the host 10 may not transfer the second command CMD2 and second address ADD2 to the second memory system 30, and the second memory system 30 may maintain the sleep mode.

The second memory system 30 may check the first value of the analysis information ANSDT when the analysis information ANSDT is transferred from the first memory system 20 (YES in step S41), in step S42.

When the first value of the analysis information ANSDT is set to represent "permission" as the check result of step S42, the second memory system 30 may exit from the sleep mode to permit access to the second memory device 302 therein, and then inform the host 10 of the exit from the sleep mode, in step S45. Since the second memory system 30 has informed the host of the exit from the sleep mode, the host 10 may recognize that the second memory system 30 has exited from the sleep mode. Therefore, the host 10 may transfer the second command CMD2 and second address ADD2 to the second memory system 30, and the second memory system 30 may control the operation of the second memory device 302 included therein in response to the second command CMD2 and second address ADD2.

On the other hand, when the first value of the analysis information ANSDT is set to represent "blocking" as the check result of step S42, the second memory system 30 may enter the sleep mode to block access to the second memory device 302 therein, and then inform the host 10 of the entry into the sleep mode, in step S48. Since the second memory system 30 has informed the host 10 of the entry into the sleep mode, the host 10 may recognize that the second memory system 30 has entered the sleep mode. Therefore, the host 10 may not transfer the second command CMD2 and second address ADD2 to the second memory system 30, and the second memory system 30 may maintain the sleep mode.

When the second memory system 30 enters the sleep mode because the first value of the analysis information ANSDT was set to represent "blocking", the second memory system 30 may check the second value of the analysis information ANSDT in step S49.

When the second value of the analysis information ANSDT is set to represent "permission" as the check result of step S49, the second memory system 30 may exit from the sleep mode to permit access to the second memory device 302 therein, and then not inform the host 10 of the exit from the sleep mode in step S51. In this way, the second memory system 30 may exit from the sleep mode in response to the second value of the analysis information ANSDT, which is set to represent "permission", and then store the first cold data CLDT1, transferred from the first memory system 20, in the second memory device 302 in step S54. Furthermore, the second memory system 30 may enter the sleep mode for blocking access to the second memory device 302 in response to completion of the operation of storing the first cold data CLDT1 in the second memory device 302, and then not inform the host 10 of the entry into the sleep mode, in step S55.

When the second value of the analysis information ANSDT is set to represent "permission" after the second memory system 30 has entered the sleep mode because the first value of the analysis information ANSDT was set to represent "blocking", the second memory system 30 may exit from the sleep mode. In this case, the second memory system 30 may not inform the host 10 of the exit from the sleep mode. When reentering the sleep mode after exiting from the sleeping mode according to the second value of the analysis information ANSDT, which is set to represent "permission", the second memory system 30 may not inform the host 10 of the entry into the sleep mode. In this way, since the second memory system 30 may not inform the host 10 of information on the exit from/entry into the sleep mode due to the second value of the analysis information ANSDT, the host 10 may recognize that the second memory system 30 continuously maintains the sleep mode. Therefore, while exiting from/entering the sleep mode according to the second value of the analysis information ANSDT, the second memory system 30 may not receive the second command CMD2 and second address ADD2 from the host 10.

On the other hand, when the second value of the analysis information ANSDT is set to represent "blocking" as the check result of step S49, the second memory system 30 may continuously maintain the sleep mode because the first value of the analysis information ANSDT was set to represent "blocking".

When entering the sleep mode because the first value of the analysis information ANSDT was set to represent "blocking", the second memory system 30 may check the fourth value of the analysis information ANSDT in step S50.

When the fourth value of the analysis information ANSDT is set to represent "permission" as the check result of step S50, the second memory system 30 may exit from the sleep mode to permit access to the second memory device 302 therein, and then not inform the host 10 of the exit from the sleep mode in step S52. In this way, the second memory system 30 may exit from the sleep mode in response to the fourth value of the analysis information ANSDT, which is set to represent "permission", and then check whether the second cold data CLDT2, to which the access frequency from the host 10 is equal to or less than the fourth reference value, is included in the data stored in the second memory device 302, in step S53.

When the second cold data CLDT2 is included in the data stored in the second memory device 302 (YES in step S53), the second memory system 30 may transfer the second cold data CLDT2 stored in the second memory device 302 to the third memory system 40, and then remove the second cold data CLDT2 from the second memory device 302 in step S56. Subsequently, the second memory system 30 may enter the sleep mode for blocking access to the second memory device 302 in response to completion of the operation of removing the second cold data CLDT2 from the second memory device 302, and then not inform the host 10 of the entry into the sleep mode in step S57.

On the other hand, when the second cold data CLDT2 is not included in the data stored in the second memory device 302 (NO in step S53), the second memory system 30 may enter the sleep mode for blocking access to the second memory device 302, and then not inform the host 10 of the entry into the sleep mode in step S57.

When the fourth value of the analysis information ANSDT is set to represent "permission" after the second memory system 30 has entered the sleep mode because the first value of the analysis information ANSDT was set to represent "blocking", the second memory system 30 may exit from the sleep mode. In this case, the second memory system 30 may not inform the host 10 of the exit from the sleep mode. When reentering the sleep mode after exiting from the sleeping mode according to the fourth value of the analysis information ANSDT, which is set to represent "permission", the second memory system 30 may not inform the host 10 of the entry into the sleep mode. In this way, since the second memory system 30 may not inform the host 10 of information on the exit from/entry into the sleep mode by the fourth value of the analysis information ANSDT, the host 10 may recognize that the second memory system 30 continuously maintains the sleep mode. Therefore, while exiting from/entering the sleep mode according to the fourth value of the analysis information ANSDT, the second memory system 30 may not receive the second command CMD2 and second address ADD2 from the host 10.

On the other hand, when the fourth value of the analysis information ANSDT is set to represent "blocking" (Blocking in step S50), the second memory system 30 may continuously maintain the sleep mode because the first value of the analysis information ANSDT was set to represent "blocking".

In an embodiment, to improve efficiency, the host 10 may request the second memory system 30 to enter/exit from the sleep mode in step S44, regardless of the absolute current time or the value of the analysis information ANSDT transferred from the first memory system 20.

When the host 10 requests the second memory system 30 to exit from the sleep mode (Permission in step S44), the second memory system 30 may exit from the sleep mode to permit access to the second memory device 302 therein, and then inform the host 10 of the exit from the sleep mode in step S47. Since the second memory system 30 has informed the host 10 of the exit from the sleep mode, the host 10 may recognize that the second memory system 30 has exited from the sleep mode. Therefore, the host 10 may transfer the second command CMD2 and second address ADD2 to the second memory system 30, and the second memory system 30 may control the operation of the second memory device 302 included therein in response to the second command CMD2 and second address ADD2.

On the other hand, when the host 10 requests the second memory system 30 to enter the sleep mode (Blocking in step S44), the second memory system 30 may enter the sleep mode to block access to the second memory device 302 therein, and then inform the host 10 of the entry into the sleep mode in step S46. Since the second memory system 30 has informed the host 10 of the entry into the sleep mode, the host 10 may recognize that the second memory system 30 has entered the sleep mode. Therefore, the host 10 may not transfer the second command CMD2 and second address ADD2 to the second memory system 30, and the second memory system 30 may maintain the state the sleep mode.

Figure 5:
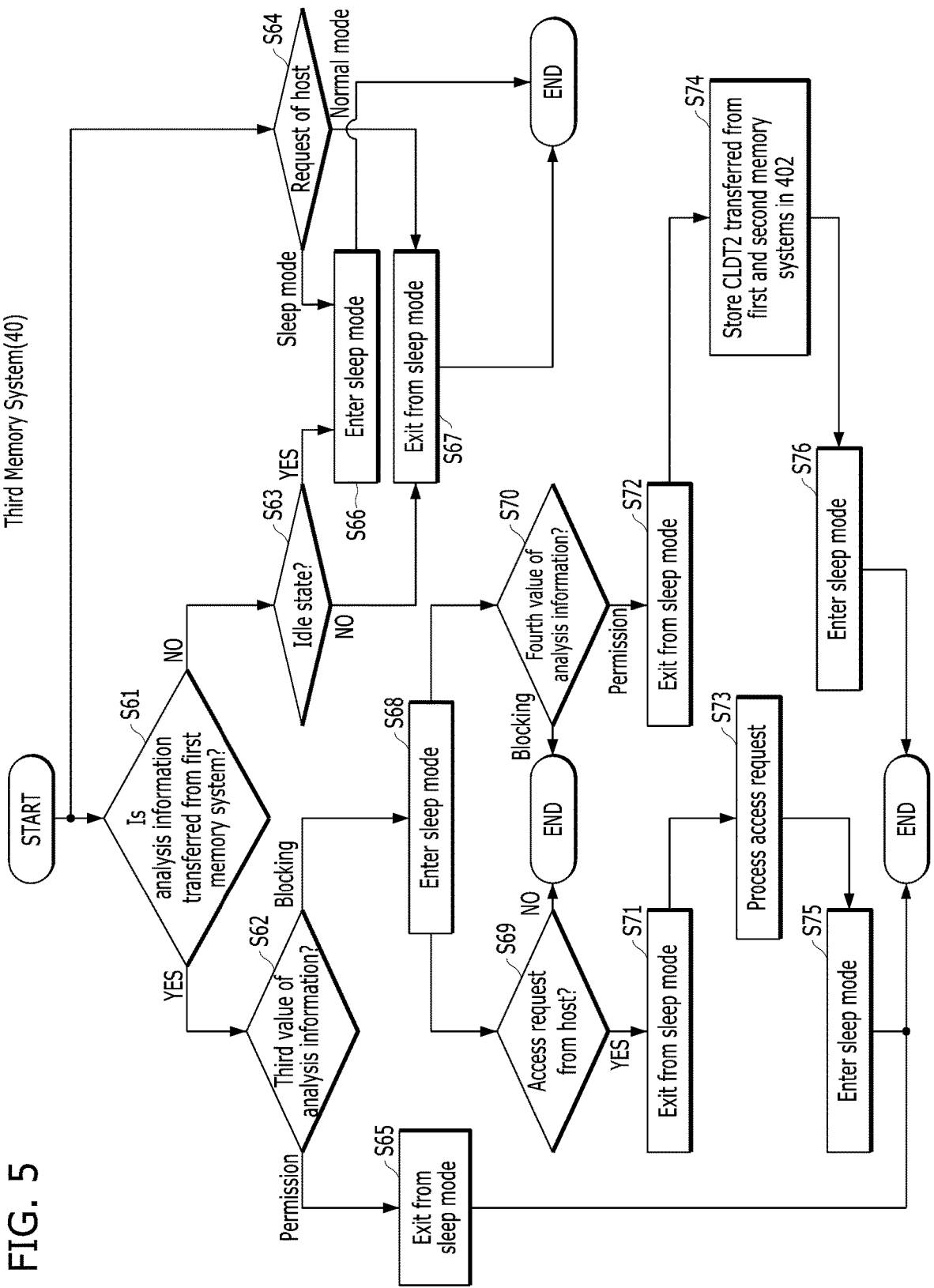
FIG. 5 is a flowchart for describing an operation of a third memory system among the components of the data processing systems in accordance with the present embodiment, which are illustrated in FIGS. 2A and 2B.

FIG. 5 is a flowchart for describing an operation of the third memory system among the components of the data processing systems in accordance with the present embodiment, which are illustrated in FIGS. 2A and 2B.

Referring to FIG. 5, the third memory system 40 may check whether the analysis information ANSDT is transferred from the first memory system 20, in step S61. When the analysis information ANSDT is not transferred from the first memory system 20 (NO in step S61), the third memory system 40 may control an operation of the third memory device 402 included therein in response to the third command CMD3 and third address ADD3 inputted from the host 10.

The third memory system 40 may check whether the third memory system 40 receives no access request from the host 10, for example, whether the third memory system 40 is in an idle state, when the analysis information ANSDT is not transferred from the first memory system 20 (NO in step S61), in step S63.

When it is checked that the third memory system 40 is not in an idle state (NO in step S63) in the case that the analysis information ANSDT is not transferred from the first memory system 20 (NO in step S61), the third memory system 40 may exit from the sleep mode in order to permit power supply to the third memory device 402 therein in step S67. On the other hand, when it is checked that the third memory system 40 is in an idle state (YES in step S63) in the case that the analysis information ANSDT is not transferred from the first memory system 20 (NO in step S61), the third memory system 40 may enter the sleep mode in order to block power supply to the third memory device 402 therein in step S66.

The third memory system 40 may check the third value of the analysis information ANSDT when the analysis information ANSDT is transferred from the first memory system 20 (YES in step S61), in step S62. When the third value of the analysis information ANSDT is set to represent "permission" (Permission in step S62), the third memory system 40 may exit from the sleep mode to permit power supply to the third memory device 402 therein in step S65. On the other hand, when the third value of the analysis information ANSDT is set to represent "blocking" as the check result of step S62, the third memory system 40 may enter the sleep mode to block power supply to the third memory device 402 therein in step S68.

An access request may be generated from the host 10 after the third memory system 40 has entered the sleep mode because the third value of the analysis information ANSDT was set to represent "blocking", in step S69.

When an access request is generated from the host 10 (YES in step S69) after the third memory system 40 has entered the sleep mode because the third value of the analysis information ANSDT was set to represent "blocking", the third memory system 40 may exit from the sleep mode to permit power supply to the third memory device 402 therein in step S71. In this way, the third memory system 40 may exit from the sleep mode in response to the access request which is generated from the host 10 after the third memory system 40 has entered the sleep mode because the third value of the analysis information ANSDT was set to represent "blocking". Thereafter, the third memory system 40 may process the access request from the host 10. For example, the third memory system 40 may perform a read/write operation on the third memory device 402. The third memory system 40 may enter the sleep mode for blocking the power supply to the third memory device 402 in response to completion of the operation of processing the access request from the host 10, in step S75.

On the other hand, when no access request is generated from the host 10 (NO in step S69) after the third memory system 40 has entered the sleep mode because the third value of the analysis information ANSDT was set to represent "blocking", the third memory system 40 may continuously maintain the sleep mode because the third value of the analysis information ANSDT was set to represent "blocking".

When the third memory system 40 enters the sleep mode because the third value of the analysis information ANSDT was set to represent "blocking", the third memory system 40 may check the fourth value of the analysis information ANSDT in step S70.

When the fourth value of the analysis information ANSDT is set to represent "permission" as the check result of step S70, the third memory system 40 may exit from the sleep mode in order to permit power supply to the third memory device 402 therein in step S72. In this way, the third memory system 40 may exit from the sleep mode in response to the fourth value of the analysis information ANSDT, which is set to represent "permission", and then store the second cold data CLDT2, transferred from at least one of the first and second memory systems 20 and 30, in the third memory device 402 in step S74. Then, the third memory system 40 may enter the sleep mode for blocking the power supply to the third memory device 402 in response to completion of the operation of storing the second cold data CLDT2 in the third memory device 402 in step S76.

On the other hand, when the fourth value of the analysis information ANSDT is set to represent "blocking" as the check result of step S70, the third memory system 40 may continuously maintain the sleep mode because the third value of the analysis information ANSDT was set to represent "blocking".

When the host 10 accesses data in the third memory system 40 after the third memory system 40 has entered the sleep mode according to the analysis information ANSDT transferred from the first memory system 20 or the information on whether the third memory system 40 is in an idle state, the third memory system 40 may operate at a slower speed than in a normal mode, which may be very inefficient from the viewpoint of the data processing system. Therefore, the host 10 may request the third memory system 40 to enter/exit from the sleep mode, regardless of whether the third memory system 40 is in an idle state or the value of the analysis information ANSDT transferred from the first memory system 20, in step S64.

When the host 10 requests the third memory system 40 to exit from the sleep mode (normal in step S64), the third memory system 40 may exit from the sleep mode to permit power supply to the third memory device 402 therein in step S67. On the other hand, when the host 10 requests the third memory system 40 to enter the sleep mode (normal in step S64), the third memory system 40 may enter the sleep mode to block power supply to the third memory device 402 therein in step S66.

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
one or more first memory systems each comprising a first memory device and each suitable for generating analysis information by performing an Artificial Intelligence (AI) computation in order to analyze operation patterns for a plurality of accumulated commands transferred from a host and a plurality of accumulated addresses corresponding to the accumulated commands; and
one or more second memory systems each comprising a second memory device having a lower operating speed than the first memory device and each suitable for selectively blocking access to the second memory device in response to the analysis information,
wherein the first memory systems are further suitable for checking, by referring to the analysis information, whether a data transfer bandwidth with the host is predicted as equal to or less than a first reference value during a first period,
wherein the first memory systems are further suitable for updating a value of the analysis information to be set for the second memory systems to block access to the second memory devices during the first period,
wherein the first memory systems are further suitable for checking, by referring to the analysis information, whether a data transfer bandwidth with the host is predicted to exceed the first reference value during a second period, and
wherein the first memory systems are further suitable for updating the value of the analysis information to be set for the second memory systems to permit access to the second memory devices during the second period.

2. The data processing system of claim 1,
further comprising one or more third memory systems each comprising a third memory device having a lower operating speed than the second memory device and a nonvolatile characteristic and each suitable for selectively blocking power supply to the third memory device in response to the analysis information,
wherein the first and second memory devices have a volatile characteristic.

3. The data processing system of claim 2, wherein the first memory systems are further suitable for controlling the first memory devices to process access-requested data from the host in response to a command and address transferred from the host in each of the first and second periods.

4. The data processing system of claim 3, wherein the second memory systems are further suitable for:
entering a sleep mode for performing an operation of retaining data stored in the second memory devices in response to the analysis information whose value is set for the second memory systems to block access to the second memory device during the first period, and informing the host of the entry into the sleep mode.

5. The data processing system of claim 4, wherein the second memory systems are further suitable for:

exiting from the sleep mode in response to the analysis information whose value is set for the second memory systems to permit access to the second memory devices during the second period, informing the host of the exit from the sleep mode, and controlling the second memory devices to process the access-requested data from the host in response to the command and address transferred from the host.

6. The data processing system of claim 5, wherein the first memory systems are further suitable for:

updating, when first cold data to which the access frequency from the host is equal to or less than a second reference value among the data stored in the first memory device is checked in the first period, the value of the analysis information to be set for the second memory systems to permit access to the second memory devices during a third period, transferring the first cold data to the second memory systems in the third period, and removing the first cold data from the first memory devices.

7. The data processing system of claim 6, wherein the second memory systems are further suitable for:

exiting from the sleep mode in response to the analysis information whose value is set for the second memory systems to permit access to the second memory devices during the third period, storing the first cold data transferred form the first memory systems in the second memory devices, entering the sleep mode in response to completion of the storing of the first cold data, and not informing the host of the exit from/entry into the sleep mode in the third period.

8. The data processing system of claim 7, wherein the first memory systems are further suitable for checking, by referring to the analysis information, whether the frequency of accesses to the third memory systems from the host is predicted as equal to or less than a third reference value during a fourth period, wherein the first memory systems are further suitable for updating the value of the analysis information to be set for the third memory systems to block power supply to the third memory devices during the fourth period, wherein the first memory systems are further suitable for checking, by referring to the analysis information, whether the frequency of accesses to the third memory systems from the host is predicted to exceed the third reference value during a fifth period, wherein the first memory systems further suitable for updating the value of the analysis information to be set for the third memory systems to permit power supply to the third memory device during the fifth period.

9. The data processing system of claim 8, wherein the third memory systems are further suitable for:

entering the sleep mode for blocking power supply to the third memory device in response to the analysis information whose value is set for the third memory systems to block power supply to the third memory devices during the fourth period, and entering a normal mode for permitting power supply to the third memory devices in response to the analysis information whose value is set for the third memory systems to permit power supply to the third memory devices during the fifth period, wherein the third memory systems are further suitable for:

exiting, when a command and address are transferred from the host while the third memory systems maintain the sleep mode, from the sleep mode only while the third memory devices process access-requested data corresponding to the transferred command and address, and reentering the sleep mode after the third memory devices process the access-requested data.

10. The data processing system of claim 9, wherein the first memory systems are further suitable for:

updating, when second cold data to which the access frequency from the host is equal to or less than a fourth reference value among the data stored in the first memory device is checked in a sixth period in which the first and fourth periods overlap each other, the value of the analysis information to be set for the second and third memory systems to permit access to the second memory devices and power supply to the third memory devices, respectively, during a seventh period within the sixth period, transferring the second cold data to the third memory systems during the seventh period, and removing the second cold data from the first memory devices.

11. The data processing system of claim 10, wherein the second memory systems are further suitable for:

exiting from the sleep mode in response to the analysis information whose value is set for the second and third memory systems to permit access to the second memory devices and power supply to the third memory devices, respectively, during the seventh period, transferring the second cold data to the third memory systems when the second cold data is checked among the data stored in the second memory devices in the sixth period, removing the second cold data from the second memory devices, entering the sleep mode in response to completion of the removing of the second cold data, and not informing the host of the exit from/entry into the sleep mode in the seventh period.

12. The data processing system of claim 11, wherein the third memory systems are further suitable for:

exiting from the sleep mode in response to the analysis information whose value is set for the second and third memory systems to permit access to the second memory devices and power supply to the third memory devices, respectively, during the seventh period, storing the second cold data, transferred from at least one of the first and second memory systems, in the third memory device, and entering the sleep mode in response to completion of the storing of the second cold data.

13. The data processing system of claim 12, wherein the second memory systems are further suitable for deciding whether to enter each of the first and second periods according to an absolute time flow and a request of the host before the first memory systems generate the analysis information, wherein the second memory systems are further suitable for deciding whether to enter each of the first and second periods according to the analysis information and a request of the host after the first memory systems generate the analysis information, wherein the third memory systems are further suitable for deciding whether to enter each of the fourth and fifth period according to a request of the host and information on whether the third memory systems are in an idle state before the first memory systems generate the analysis information, and wherein the third memory systems are further suitable for deciding whether to enter each of the fourth and fifth periods according to the analysis information and a request of the host after the first memory systems generate the analysis information.

14. The data processing system of claim 2, wherein each of the first memory systems further comprises a fourth memory device having a nonvolatile characteristic, wherein the first memory systems are further suitable for:

generating the accumulated commands and the accumulated addresses by accumulating and storing source information on commands and addresses, transferred from the host to the first to third memory systems, in the fourth memory devices, generating the analysis information by performing the AI computation on the accumulated commands and the accumulated addresses, and storing the generated analysis information in the fourth memory devices.

15. The data processing system of claim 14, wherein the source information comprises type information, relation information, input point information and input sequence information of the commands transferred from the host to the first to third memory systems, and location information, location distance information, and location change information of the addresses transferred from the host to the first to third memory systems.

16. The data processing system of claim 15, wherein the first memory systems are further suitable for checking, by referring to the analysis information, whether the frequency of accesses to the first memory systems from the host is predicted as equal to or less than a fifth reference value during an eighth period, wherein the first memory systems are further suitable for updating the value of the analysis information to be set for the first memory systems to perform the AI computation on the accumulated commands and the accumulated addresses during the eighth period.

17. The data processing system of claim 16, wherein the first memory systems are further suitable for deciding whether to enter the eighth period according to a request of the host and information on whether the first memory systems are in an idle state before the analysis information is generated, and wherein the first memory systems are further suitable for deciding whether to enter the eighth period according to the analysis information and a request of the host after the analysis information is generated.

18. The data processing system of claim 17, wherein each of the first to third memory systems comprises a first interface and a second interface, wherein the first to third memory systems are coupled to the host through the first interface and coupled to one another through the second interface, wherein the first memory systems further comprise a third interface and are coupled to the fourth memory devices through the third interfaces.

* * * * *